(12) United States Patent
Rice, Jr.

(10) Patent No.: US 6,839,609 B2
(45) Date of Patent: Jan. 4, 2005

(54) SYSTEM, METHOD AND APPARATUS FOR ON-DEMAND PRINTING OF HAZARDOUS MATERIALS PLACARDS FOR USE IN THE TRANSPORTATION AND/OR STORAGE OF HAZARDOUS MATERIALS

(75) Inventor: Richard Mark Rice, Jr., St. Charles, MO (US)

(73) Assignee: Timothy Ridge LLC, St. Charles, MO (US)

( * ) Notice: Subject to any disclaimer, the term of this patent is extended or adjusted under 35 U.S.C. 154(b) by 24 days.

(21) Appl. No.: 10/413,319

(22) Filed: Apr. 14, 2003

(65) Prior Publication Data

US 2004/0204790 A1 Oct. 14, 2004

(51) Int. Cl.[7] .............................. G06F 7/00; G06F 17/00
(52) U.S. Cl. ...................... 700/227; 700/233; 700/235; 700/215
(58) Field of Search ................................. 700/213, 214, 700/215, 225, 226, 227, 233, 235

(56) References Cited

U.S. PATENT DOCUMENTS

| | | | | |
|---|---|---|---|---|
| 4,034,339 A | * | 7/1977 | Free et al. ..................... | 714/45 |
| 5,532,928 A | * | 7/1996 | Stanczyk et al. ........... | 700/213 |
| 5,822,716 A | | 10/1998 | Morell et al. | |
| 6,097,955 A | * | 8/2000 | Bhat ........................... | 455/445 |
| 2002/0103570 A1 | | 8/2002 | Petrancosta | |

OTHER PUBLICATIONS

*Keller's 2002 HazMat Catalog*; 2002; Catalog Identification No. 405455–032; J. J. Keller & Associates, Inc.; USA.
*Hazardous Materials Chart*; 1999; Identification No. 51–FA (Rev. 7/99) 1296; J. J. Keller & Associates, Inc.; USA.
*Hazardous Materials Placarding Chart*; 2002; Identification No. 39–FB (Rev. 1/02) 1132; J. J. Keller & Associates, Inc.; USA.
*Hazardous Materials Load and Segregation Chart*; 2001; Identification No. 41–FB 1168 (Rev. 10/01); J. J. Keller & Associates, Inc.; USA.

* cited by examiner

Primary Examiner—Gene O. Crawford
(74) Attorney, Agent, or Firm—Thompson Coburn LLP

(57) ABSTRACT

A system for on-demand printing of hazardous material placards, the system comprising: (a) an input device through which a user can input parameters relating to a hazardous material to be transported or stored; (b) a processor configured to determine a hazardous material placard for the hazardous material according to a computerized analysis of the input parameters; and (c) an output device configured to print the determined placard. Preferably, the processor determines the appropriate placard by executing a placard selection program that comprises a plurality of placard selection rules, wherein the placard selection rules define the conditions under which a placard is to be used. Further, the placard selection rules preferably comply with government regulations relating to the shipment and/or storage of hazardous materials. Also, the system may display a menu of placards selectable by the user for printing.

62 Claims, 14 Drawing Sheets

| | | | | | | | |
|---|---|---|---|---|---|---|---|
| TO:<br>Consignee:<br>Street<br>Destination | | | Zip | | FROM:<br>Shipper:<br>Street<br>Origin | | Zip |
| Route: | | Vehicle #: | | | US DOT HazMat Reg. No.: | | |
| HM | No.<br>Shipping<br>Units | Kind of Package(s); Description of<br>Articles (If hazardous material is present,<br>the proper shipping name is to be used) | Hazard<br>Class | ID<br>Number | Packing<br>Group | Weight | Rate | Labels<br>Required<br>(or exemption) |
| | .......... | | .......... | .......... | .......... | .......... | .......... | .......... |
| | | | | | | | | |
| | | | | | | | | |

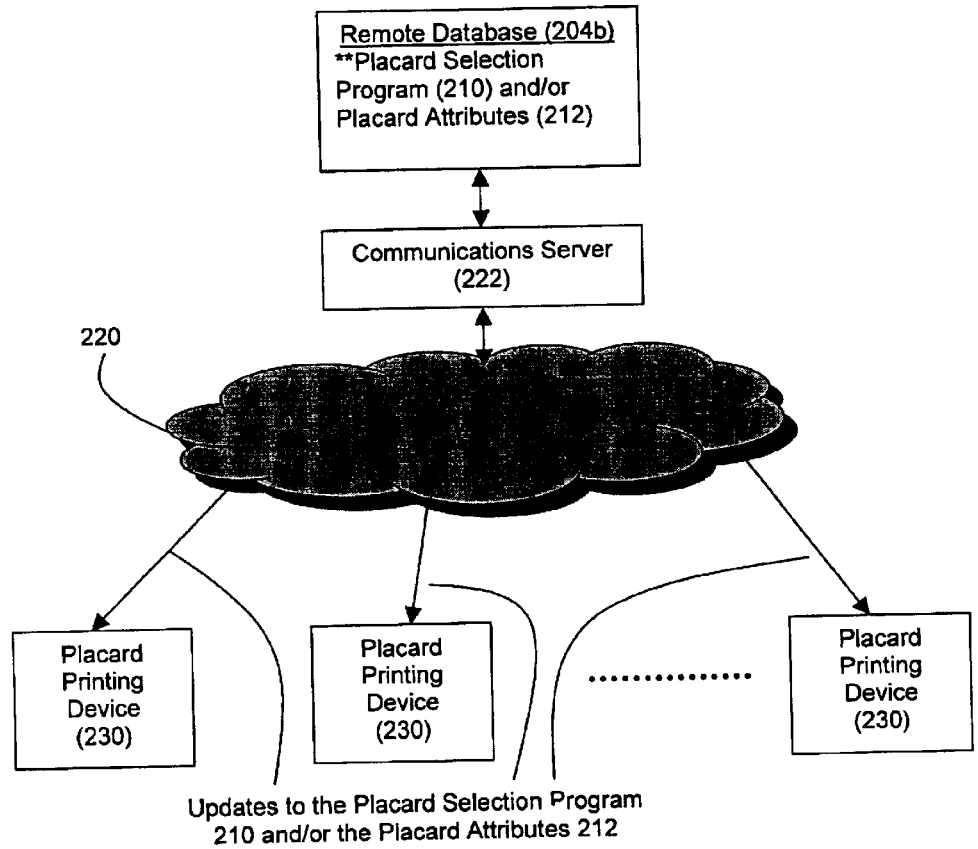
Figure 12(a)
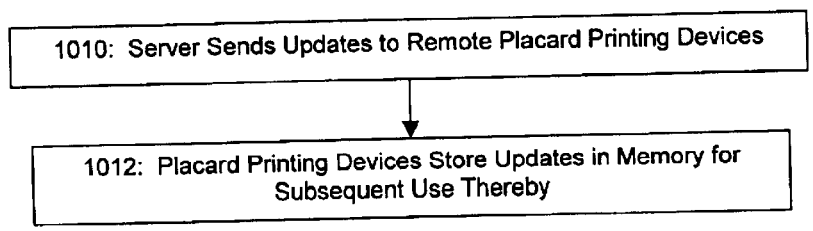
Figur 12(b)

SYSTEM, METHOD AND APPARATUS FOR ON-DEMAND PRINTING OF HAZARDOUS MATERIALS PLACARDS FOR USE IN THE TRANSPORTATION AND/OR STORAGE OF HAZARDOUS MATERIALS

FIELD OF THE INVENTION

The present invention relates to a technique for printing hazardous material placards of the type that are used in connection with the transportation and/or storage of hazardous materials.

BACKGROUND AND SUMMARY OF THE INVENTION

Hazardous material placards are well-known items that are used within the transportation industry and storage/warehousing industry to warn people of the presence of hazardous materials. Different types of hazardous materials merit different types of placards. Because the handling of hazardous materials is a major safety issue of national importance, a large number of government regulations define the conditions under which various placards are to be used (see, for example, 49 CFR Part 172; 49 CFR 177.823; and other well-known regulations governing the use of placards in connection with hazardous materials; see also "Handling Hazardous Materials", J. J. Keller & Associates, Inc, 2001, the entire disclosures of all of which are incorporated herein by reference). For example, for a shipment of nickel cyanide, a POISON placard would be appropriate, while for a shipment of morpholine, a FLAMMABLE placard would be appropriate. Under these government regulations, factors that affect the selection of an appropriate placard may include: (1) the class(es) of hazardous material(s) involved, and (2) the amount(s) of hazardous material(s) involved.

Because of the complexity of such government regulations, efforts have been made in the art to develop a system that automatically identifies an appropriate placard for use with the transportation or storage of a hazardous material. For example, U.S. Patent Application Publication 2002/0103570 (in the name of Petrancosta), the entire disclosure of which is incorporated herein by reference, discloses such an effort.

However, while systems such as the one disclosed by Petrancosta provide a general improvement in the art with respect to identifying an appropriate placard for use in the shipment or storage of hazardous materials, it is the inventor's belief that such systems have failed to achieve widespread acceptance in the marketplace because of a variety of substantial shortcomings that hinder their value.

First, in conventional practices known to the inventor, transportation terminals and warehouse/storage facilities must purchase large numbers of different kinds of placards. These placards, which are held in inventory, are selected for use with the transportation and/or storage of hazardous materials as needed. Once selected for use, a placard is affixed to either the outside of the transportation vehicle or the material packaging/container at a visible location (see, for example, 49 CFR 172.516).

The task of ensuring that the placard inventory is complete and up-to-date is a complex one that many entities struggle with. To maintain an inventory of a full set of placards that accounts for all of the potential combinations of placard type, classification number, and UN numbers, a company would have to constantly track the supply and usage of thousands of different hazardous material placards.

Alternatively, many companies opt to purchase a large number of generic placard types (e.g., "flammable" placards, "corrosive" placards, etc.) with either or both of the class number and UN number fields blank. Under such an approach, companies typically maintain a large inventory of stickers or number tiles that that can be affixed to the generic placards as necessary to accommodate different hazardous material types. While reducing the size and complexity of maintaining the placard inventory, this approaches requires companies to manage an inventory of stickers and/or number tiles.

Moreover, as conventional hazardous material placards circulate throughout the national and international transportation networks, they are inevitably re-used and sometimes altered to accommodate supply shortages. For example, it is relatively common for a placard to have its UN number modified to accommodate a given shipment, by for example changing a "1" to a "7" using a black marker or black tape. Similarly, white tape has been used to change the number "4" to a "1".

While such hand-numbering and alterations are not encouraged, they are an inevitable consequence of the conventional business practices relating to hazardous material placards because no matter how hard a company may try to keep its placard inventory complete, a situation will almost assuredly arise where a shipment of a given amount of hazardous material will be slated for transportation or storage and the proper placard is unavailable. In situations like these, companies are faced with a tough dilemma of whether to modify an existing placard to approximate the government-mandated placard or ship/store the hazardous material without the appropriate placard. Unfortunately, as evidenced by the volume of fines imposed on transportation companies for improper placarding, problems do exist in the field wherein shipments leave a terminal or warehouse without the appropriate placard. This not only violates government regulations but also creates a substantial safety problem.

Hazardous material placards perform an important safety role in that they allow firefighters and other emergency response personnel to quickly identify a potential problem and how that problem should be handled. For example, if a tractor-trailer full of a particular kind of toxic or corrosive substance is involved in an accident, it is extremely important that responding emergency personnel be able to quickly and accurately identify the type of hazardous material involved. Such personnel typically possess manuals that identify response procedures for dealing with specific hazardous materials, and if the tractor-trailer is improperly placarded, a substantial breakdown in the safety process is created.

Further, the use of stickers or hand-numbering to create an appropriate placard from a generic placard allows for the introduction of human error into the placarding process. This human error may relate to the improper selection of numbers (e.g., transposing numbers such that "1409" is used as a UN number when "1049" was intended), or in inadequately affixing the number(s) to the placard such that the number(s) fall off the placard during movement of the hazardous material(s).

Further still, the costs related to maintaining a sufficient inventory of placards and placard-related items (such as number stickers, etc.) is substantial. For a relatively small over-the-road transportation company, the placard inventory costs can be as much as $50,000 per year (not including any fines that such a company may incur for improper placarding citations). For large transportation companies or large manufacturers who ship large amounts of hazardous materials, the inventor herein believes that the yearly placard inventory costs may reach six or seven figures.

Moreover, the storage of large numbers of placards at transportation terminals or storage facilities creates a space problem. That is, a large amount of space at the terminal or facility must be set aside for storing the placards.

In an effort to solve these aforementioned problems in the art, the inventor herein has developed a system, method and apparatus that allows a user to print, on-demand, the appropriate placard for a hazardous material to be shipped or stored. The present invention alleviates the burdens related to maintaining a placard inventory and greatly reduces the amount of human error that can be introduced into the placarding system. Further, the present invention provides these benefits while reducing the placard-related costs borne by a company because placard supply is optimized to exactly match placard demand via an elegantly simple low-cost on-demand placard production process.

Accordingly, under one aspect of the present invention, disclosed herein is a system comprising: (1) an input device through which a user can select a hazardous material placard from a menu of hazardous material placards; (2) memory in which placard attributes are stored, the placard attributes defining the graphical appearance of a plurality of hazardous material placards; (3) a processor in communication with the input device and memory, wherein the processor is configured to retrieve from memory the placard attributes corresponding to the selected placard; and (4) an output device in communication with the processor, wherein the output device is configured to print one or more hazardous material placards in accordance with the retrieved placard attributes.

The above-described system works well in situations where the user already knows of the hazardous material placard that is needed. However, it is often the case where the user is uncertain of the necessary hazardous material placard(s). For example, in a situation wherein a transporter intends to ship a composite cargo of X pounds of Hazardous Material 1 and Y pounds of Hazardous Material 2, the appropriate placard for the shipment may not be readily known because relatively complex government regulations define how placards are to be selected for composite shipments. In an effort to ensure the shipment is appropriately placarded, the present invention also provides a process for determining the appropriate placard to be printed on-demand as a function of user input related to the various parameters related to the hazardous materials to be shipped or stored. It should be noted that this feature of the present invention can be used in connection not only with composite shipments of a plurality of hazardous materials but also the shipment and/or storage of an amount of a single type of hazardous material.

Thus, according to another aspect of the present invention, disclosed herein is a system comprising: (1) an input device through which a user can input parameters relating to a hazardous material to be transported or stored, (2) a processor configured to determine a hazardous material placard for the hazardous material according to a computerized analysis of the input parameters, and (3) an output device configured to print the determined placard.

Preferably, the input and output device are located in a facility where hazardous material placards are needed, such as a transportation terminal or a storage facility. Transportations terminals may include facilities such as trucking terminals, rail terminals, port facilities, road-side truck stops or gas stations that cater to over-the-road truckers, weigh stations, inspection stations, loading/unloading docks at manufacturing facilities, and the like. Storage facilities may include warehouses, railyards, tractor-trailer yards, and the like. Each facility may include a plurality of such input and output devices to allow concurrent placard printing by a plurality of users.

Also, the processor is preferably further configured to execute a hazardous material placard selection program, wherein the program is configured to determine a hazardous material placard according to a relationship between the input parameters and a plurality of predetermined hazardous material placard selection rules. These placard selection rules preferably comply with applicable government regulations relating to hazardous materials.

Further, the system preferably further comprises memory that is configured to store a plurality of hazardous material placard attributes, wherein the placard attributes correspond to the appearances of the placards, wherein the processor is further configured to retrieve the stored attributes corresponding to the determined placard, and wherein the output device is further configured to print the determined placard in accordance with the retrieved attributes. The placard produced by the output device preferably complies with the applicable government regulations in connection with the appearance of hazardous material placards.

The input parameters provided by the user preferably relate to the class(es) of hazardous material(s) to be transported or stored, and the amount(s) of the hazardous material(s). However, other parameters may be used in addition to or instead of these parameters, such as the UN number(s) of the hazardous material(s), the North American number(s) of the hazardous material(s), the name(s) of the hazardous material(s), and the like. However, it should be noted that the inventor prefers that hazardous material amount remain one of the input parameters, particularly when composite shipments comprising a combination of different types of hazardous materials are involved.

Also, the placard selection rules and placard attributes also preferably take into account using the appropriate UN identification numbers and classification numbers on the placards for the hazardous materials. Further still, the placard selection rules preferably implement the segregation and compatibility rules that relate to composite shipments.

Further, the components of the system may be implemented in a distributed manner, thereby taking advantage of the flexibility provided by communications networks such as the Internet. Such distributed implementation allows centralization for features of the invention that are broadly applicable to each local input device and output device.

Additional features of the present invention include the ability to implement a payment system for the placard printing process and the ability to adjust the placard selection program and/or placard attributes to changes via a centralized server.

Moreover, the present invention may be implemented on a computer readable medium. Such a medium may include, but is not limited to a CD-ROM disk, a computer hard drive, software resident on a network-accessible server, and the like.

Thus, the invention provides an elegantly simple and low-cost solution to the placard inventory management problem. Further, the present invention provides a means for improving the safety of the nation's transportation network and storage facilities by greatly reducing the amount of human error that can be introduced into the placarding process. Further still, the present invention provides a means by which a company can cost-effectively minimize the likelihood of government fines for improper placarding.

These and other features and advantages of the present invention will be in part pointed out and in part apparent to those of ordinary skill in the art upon review of the following description, figures, and claims.

BRIEF DESCRIPTION OF THE DRAWINGS

FIG. 3 illustrates an exemplary bill of lading for a shipment of a hazardous material;

FIGS. 4(a) and (b) illustrate preferred GUIs through which a user inputs pertinent hazardous material data;

FIGS. 12(a) and (b) illustrate how a central server can be used to control the distribution of updates to the placard selection program and/or placard attributes.

DETAILED DESCRIPTION OF THE PREFERRED EMBODIMENT

Figure 2A:
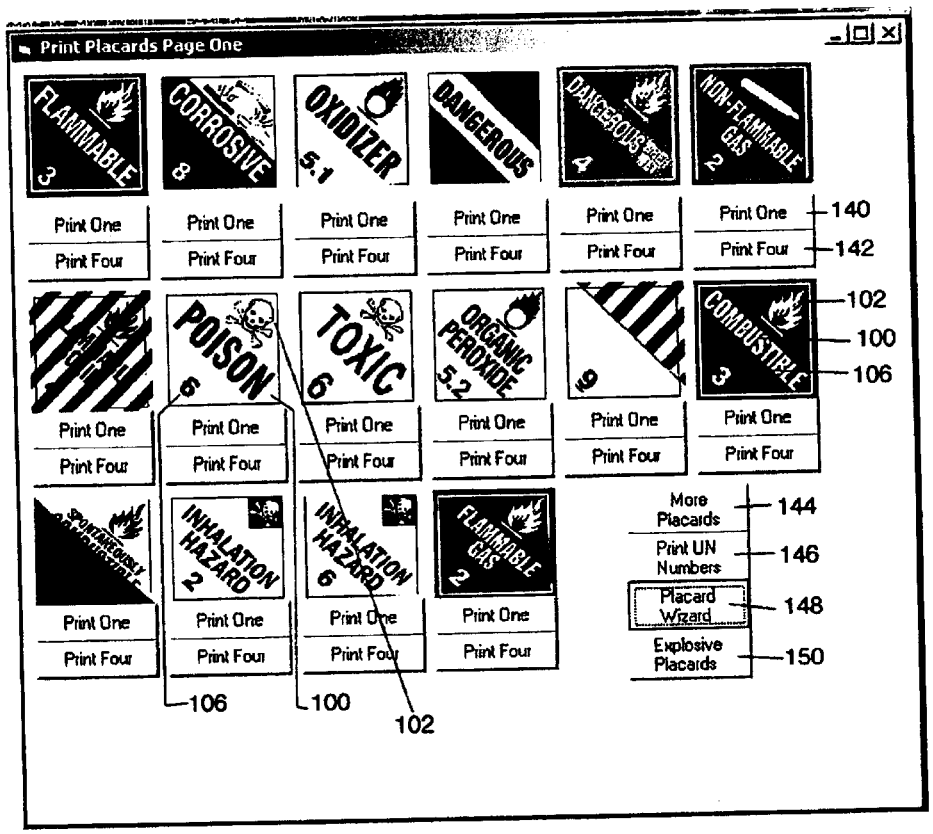
FIGS. 2(a)–(d) illustrate preferred graphical user interfaces (GUIs) comprising a menu of hazardous material placards that are user-selectable for printing.

FIGS. 2(a)–(d) include depictions of exemplary hazardous material placards 100. For example, FIG. 2(a) illustrates several placards 100, including a "poison" placard 100 and a "combustible" placard 100. The referenced "poison" placard includes a graphical symbol 102 that is indicative of poison and a class number 106 that is indicative of the class of hazardous materials to which that particular "poison" placard pertains. Similarly, the referenced "combustible" placard includes a graphical symbol 102 that is indicative of a combustible material and a class number 106 that is indicative of the class of materials to which that particular "combustible" placard pertains. Hazardous material class and subclass numbers, which are well-known in the art, are used to denote a relatively broad class of hazardous materials.

Figure 2B:
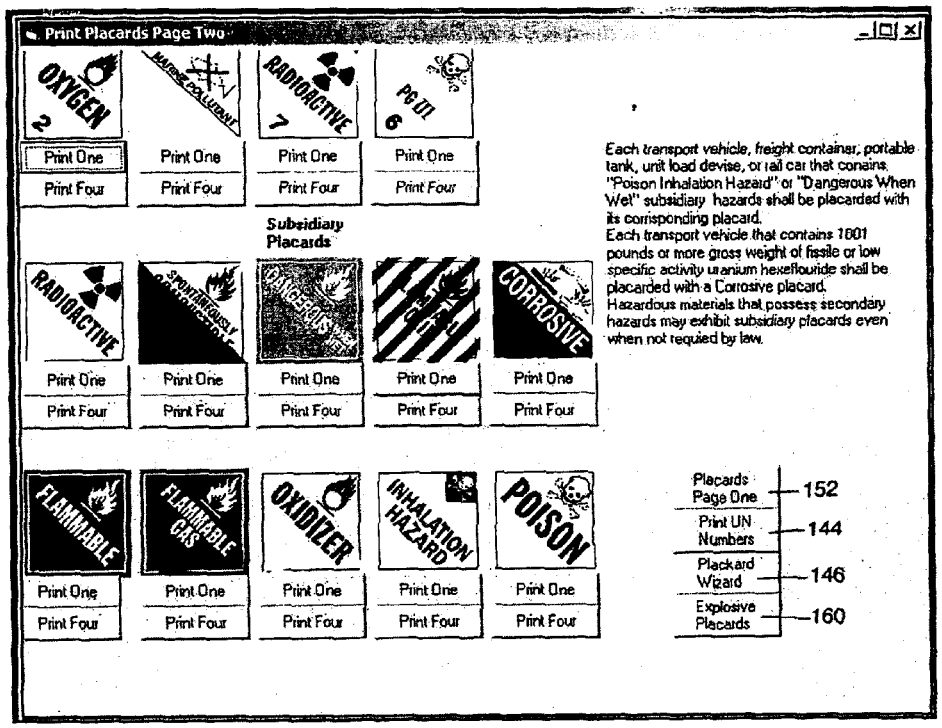
Figure 2C:
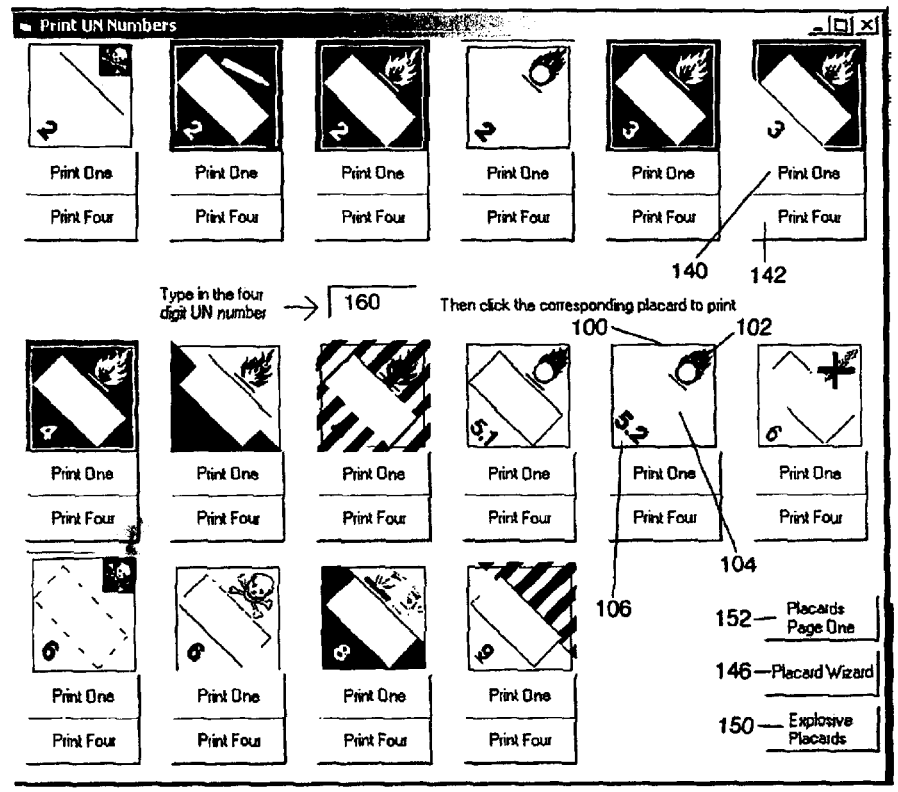

FIG. 2(c) illustrates several depictions of exemplary placards 100 that include an identification number field 104. The UN number that corresponds to the specific type of hazardous material being transported or stored populates field 104. Alternatively, a North American identification number can fill this field. However, as UN numbers are the dominant identification number for hazardous material placards (and will presumably become increasingly dominant as time goes on in today's global economy), the inventor contemplates that the UN number will be the most preferred identification number to include in field 104. UN numbers and North American numbers are well-known in the art, and as would be readily understood by those persons of ordinary skill in the art, there are literally thousands of potential placards that may be needed by a transporter to accommodate the multitude of permutations between placard types, class numbers, and UN numbers. The present invention preferably provides the ability to produce any such placards on demand as needed by a party.

Figure 1:
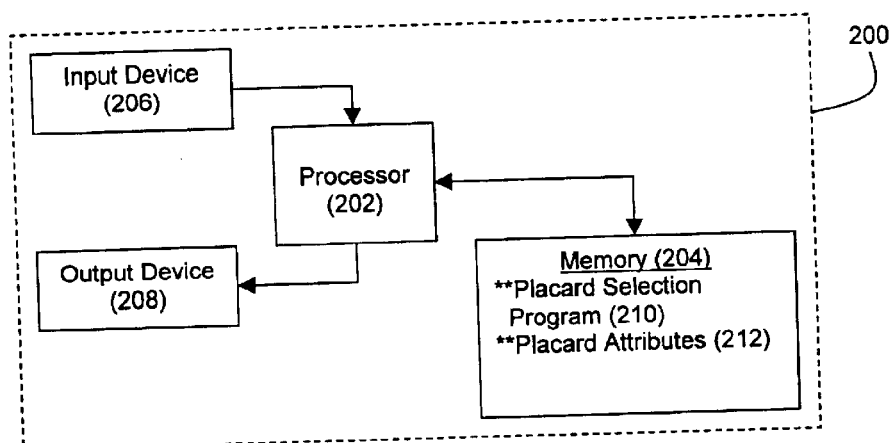
FIG. 1 illustrates an overview of the present invention.

FIG. 1 illustrates an overview of a preferred embodiment of the present invention. The placard printing system 200 comprises a processor 202 with associated memory 204, an input device 206 in communication with the processor, and an output device 208 also in communication with the processor.

Memory 204:

Preferably, memory 204 stores a placard selection program or module 210 that is executable to determine an appropriate placard as a function of predetermined placard selection rules and any hazardous materials data provided by a user via the input device 206. Further, memory 204 also stores a plurality of placard attributes 212 that correspond to the appearance of a desired placard. Preferably, the placard attributes are stored in memory as bitmap files that correspond to the different placard types shown in FIGS. 2(a)–(d). When a UN number or other variable data item needs to be printed on the placard, the program can insert that data in the necessary field for printing. It should be readily understood, however, that the placard attributes can be stored in formats other than bitmaps, such as jpegs or the like. Further, rather than store the placard attributes as discrete placards, subfeatures of the placards' graphical appearances can be stored (e.g., the different symbols or background colors, class fields, UN number fields, etc.) separately and assembled as needed at print time. Further still, the placard attributes can be stored in memory after scanning existing hazardous material placards into memory with a scanner.

Preferably, the placard attributes are stored in memory to allow placard printing wherein the resultant placard's appearance complies with government regulations (see, for example, 49 CFR 172.519–172.560, the disclosures of all of which are incorporated herein by reference). Any known techniques for defining graphical appearances and formatting technologies may be used to define the placard attributes and fit the placard into desired dimensions, colors, and font sizes.

Also, as would be understood by those of ordinary skill in the art, while memory 204 is shown as a unitary box in FIG. 2, in implementation, the memory may be implemented in a distributed manner with several memory units, each storing some portion of the module 210 or attributes 212. Further, as will be more apparent below, the memory 204 may be local to the processor 202 or it may be a remote database accessible to the processor 202. For example, the memory 204 may be implemented as a database accessible to the processor via a communications network such as the Internet.

Input Device 206:

The input device 206 is an interface through which a user can select one or more placards for printing via either (1) direct selection of a placard or (2) input to the processor 202 of pertinent data relating to the hazardous material(s) to be shipped or stored. Examples of such data include the class of hazardous material and the quantity (preferably weight) of hazardous material. Other parameters that can be used in conjunction with or in place of class and quantity include UN number, North American number, hazardous material name, hazardous material description, and a shipping label code. These parameters are preferably known by the user via the bill of lading that accompanies the hazardous material to be shipped or stored.

FIG. 3 illustrates an exemplary bill of lading 120 that accompanies hazardous materials during transport or storage. Field 122 identifies the number of units being shipped. Field 124 identifies whether the unit being shipped contains a hazardous material. Field 126 describes the material being shipped, and if that material is a hazardous material, includes the proper shipping name of the hazardous material. Field 128 identifies the appropriate class number for the hazardous material. In the preferred embodiment wherein class number is used as an input parameter in the placard selection process, the user can learn of the appropriate class number from field 128. Further, field 128 may also include the hazardous material's division number (if applicable) and compatibility group (if applicable). Field 130 similarly identifies the appropriate UN number for the hazardous material. Field 132 identifies the type of packaging used for the shipment (e.g., drum, box, etc.). Field 134 identifies the weight of the shipment (which can be in any unit of weight measurement). In the preferred embodiment wherein amount is used as an input parameter in the placard selection process, the user can learn of the appropriate hazardous material amount from field 128. Government regulations strictly mandate the maintenance of the bill of lading 120, and because the bill of lading should always accompany the hazardous material being shipped (usually within reach of the person performing the transportation such as a truck driver), the bill of lading can serve as an excellent accurate source for the user's input parameters during the placard selection process.

Preferably, the input device 206 comprises a monitor with a graphical user interface (GUI) and a keyboard or mouse through which the user can select one or more placards or populate various fields of the GUI with pertinent hazardous materials data. However, while a GUI interface with keyboard/mouse input is preferred, the input device can be any device through which a user can provide data to a computer. Other implementations include, but are not limited to, (1) a touchscreen GUI, (2) a touchscreen GUI with stylus input, (3) a GUI with mouse input wherein each GUI field is populatable via a drop-down menu with potential data values, (4) a voice-to-computer text synthesis module for converting a user's spoken words into machine-readable data values, (5) a scanner for optically scanning an existing document (such as the bill of lading) with pertinent data thereon and converting the scanned data into the necessary data fields, etc.

FIGS. 2(a)–(d) illustrate preferred GUIs for direct selection of placards for printing from a menu of available placards. The GUI depicted in FIG. 2(a) includes several placards 100 available for selection and printing via user-selectable buttons 140 and 142. Each button 140 effectuates the printing of a single corresponding placard 100 while each button 142 effectuates the printing of a plurality (four in the example shown) of the corresponding placards 100. If the user does not find the desired placard on the GUI of FIG. 2(a), the selection of the "More Placards" button will cause the GUI of FIG. 2(b) to be displayed. The GUI of FIG. 2(b) is highly similar to the GUI of FIG. 2(a), but includes the placards 100 that are not shown in FIG. 2(a) and includes a user-selectable button 152 allowing navigation back to the GUI of FIG. 2(a). The GUI of FIG. 2(b) further allows for the selection and printing of subsidiary placards 100. As noted in the text portion of the GUI, and as is well-known in the art, for each transport vehicle, freight container, portable tank, unit load device, or rail car that contains a hazardous material requiring a "poison inhalation hazard" placard or a "dangerous when wet" placard, subsidiary placards should be used together with the corresponding primary placard. Further, as noted, subsidiary placards may be used with hazardous materials that possess secondary hazards, even though not required by law.

In the event the user needs to print a placard 100 that includes a UN number, the user can select the "print UN numbers" button 144 to navigate to the GUI of FIG. 2(c). The GUI of FIG. 2(c) includes a field 160 in which a user can enter the appropriate UN number for a particular hazardous material. Preferably, the user will identify this number from the bill of lading that corresponds to the hazardous material. After entering a UN number in field 160, the user can print a placard with that UN number located in field 104 of the placard 100 by selecting the appropriate button 140 or 142.

Because each placard has a set of UN numbers which may be used in conjunction therewith, program logic preferably associates a permissible set of UN numbers with each placard 100 (the set comprising one or more UN numbers that may permissibly be used with the particular placard). The sets can be readily determined from government regulations, such as the hazardous materials table (HMT) defined in 49 CFR 172.101, the entire disclosure of which is incorporated herein by reference. The HMT identifies the class number and UN number for all hazardous materials. From this data, the permissible UN numbers for each placard are readily determinable. Thus, the programming logic can detect when a user has selected a UN number that is not compatible with a selected placard. Upon such detection, the programming logic preferably prevents the printing of the selected placard and notifies the user of the error.

Figure 2D:
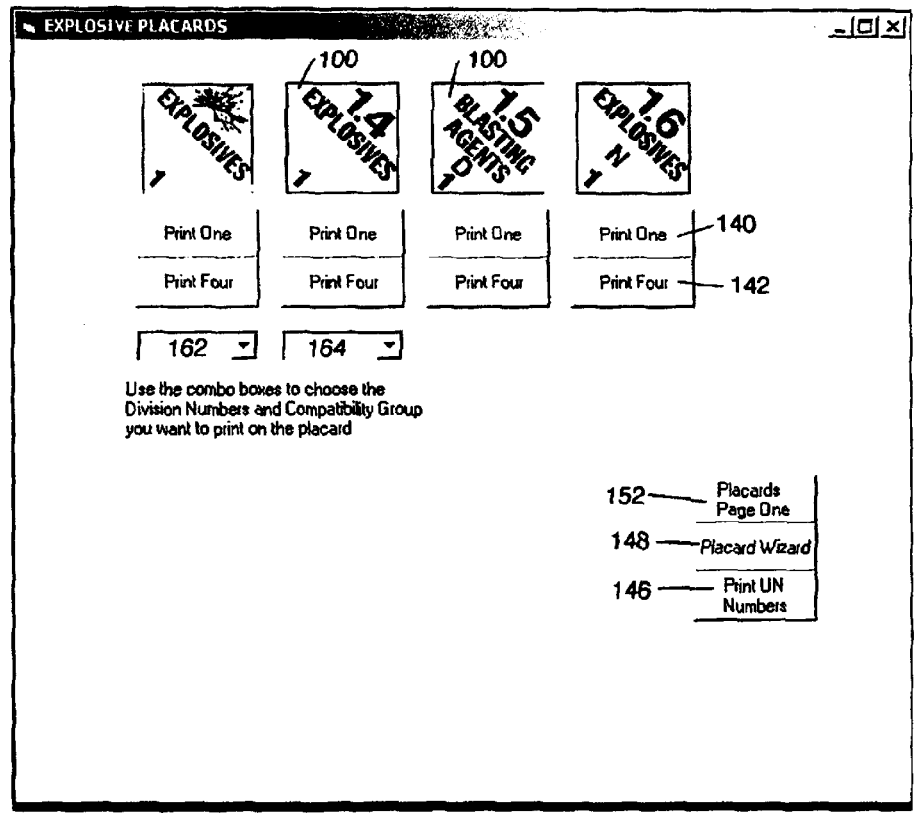
Figure 4A:
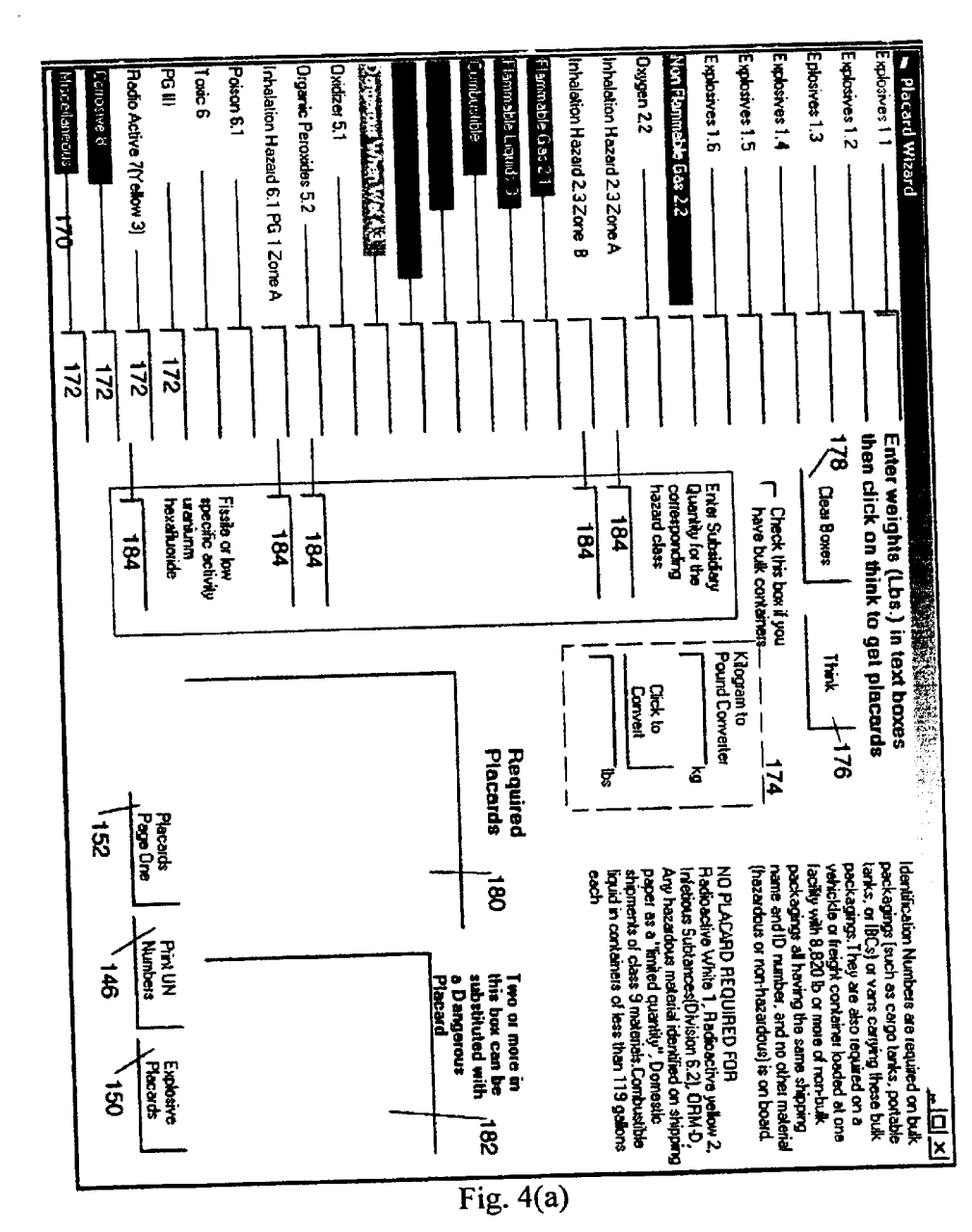

In the event the user needs to print a placard 100 for a hazardous material that is explosive, the user can select the "explosive placards" button 150 to navigate to the GUI of FIG. 2(d). The GUI of FIG. 2(d) includes various "explosives" placards 100 that can be selected via buttons 140 and 142. For the two leftmost placards 100, a user also is given the option of placing division numbers and compatibility group identifiers on the corresponding placards 100 via data entry in fields 162 and 164. A dropdown menu may be used to present a list of available options to the user. Further, it is preferable that programming logic be used to ensure that the division numbers (e.g. the numbers following the decimal point after the class number) and compatibility group identifier (e.g., the letters that indicate which divisions can be loaded or stored together, wherein a common compatibility identifier indicates that co-loading/co-storing is permissible) comply with government regulations. If the user is uncertain of what placard(s) is/are needed for a hazardous material (or combination of hazardous materials), the present invention provides a GUI as shown in FIG. 4(a), referred to as a "placard wizard". Via the placard wizard GUI of FIG. 4(a), a user can enter pertinent parameters relating to one or more hazardous materials to be shipped or stored and learn of the necessary placard requirements.

As noted above, the bill of lading that accompanies the hazardous material is preferably the source of the input data for the placard wizard GUI. Namely, the bill of lading will identify the hazardous material class and hazardous material weight. Accordingly, for each hazardous material class listed in column 170, there is a corresponding field 172 in which the user can enter the weight for the amount of hazardous material to be shipped or stored. Preferably this weight is in pounds, but as would be readily understood, other units of measurement, such as those of the metric system, can be used in the practice of the present invention. Further, an interface 174 for converting from metric (e.g., kilograms) to pounds can be provided for the user's convenience.

Upon entering the weight of the hazardous material class for each component of the units being shipped or stored, the user can select the "think" button 176 (the user can select the "clear boxes" button 178 to clear any data entered in the fields 172). Selection of the "think" button triggers the placard selection program to determine the appropriate placard(s) for the parameters input by the user. As explained in more detail below, the preferred placard selection program implements a plurality of placard selection rules via programming logic to determine placard requirements for a given set of input parameters. The results of the placard selection program are displayed in fields 180 and 182. Field 180 identifies the placard or placards that are required for the hazardous material(s) represented by the user input. Field 182 identifies placards which may be optionally replaced by a "dangerous" placard. Once the placards in fields 180 and 182 are identified, a user can either return to the GUIs of FIGS. 2(*a*)–(*d*) to print the appropriate placards, or a print button (not shown) that is configured to print the placards in field 180 (and optionally field 182) can be implemented on the placard wizard GUI. Further, the placard wizard GUI preferably includes fields 184 that allow user entry of the weights for subsidiary amounts of materials in certain hazard classes.

Figure 4B:
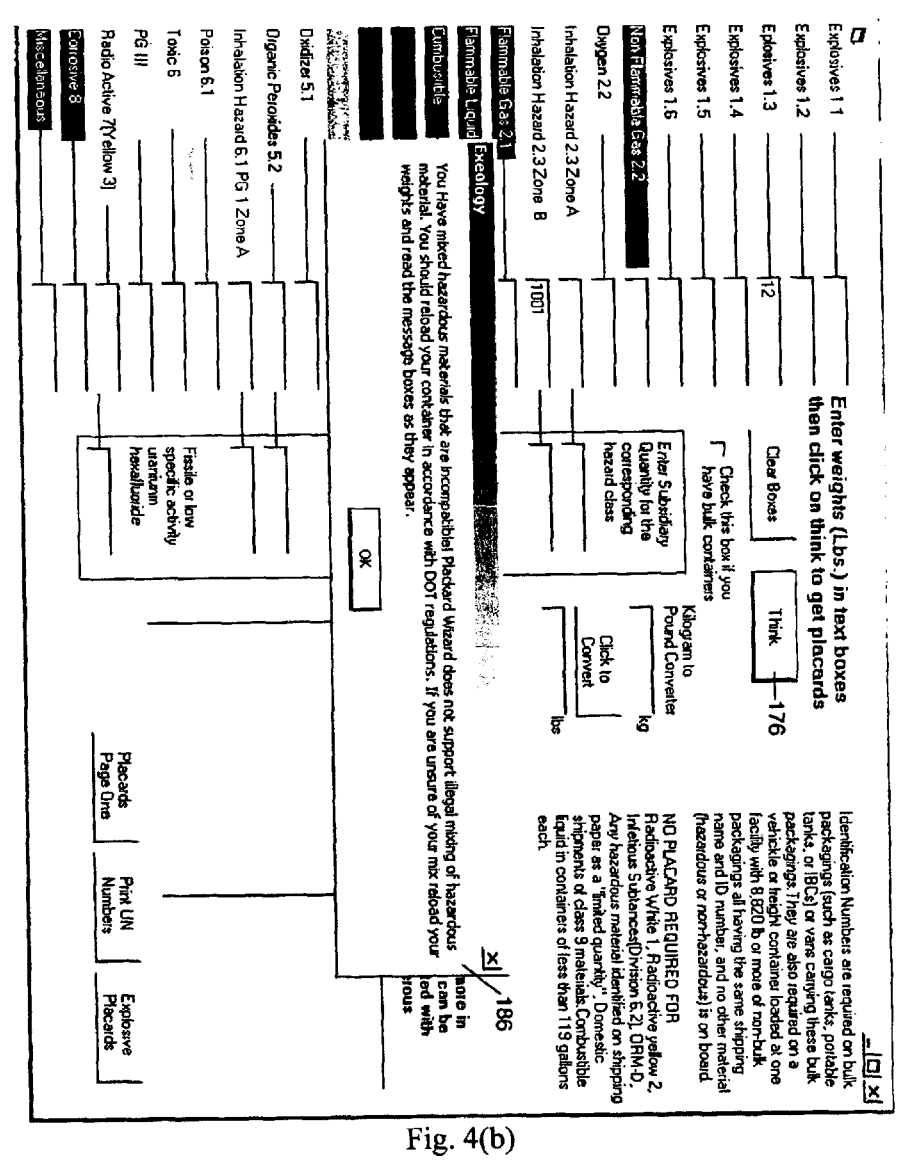

Through the placard selection rules implemented in logic by the placard selection program, it is preferred that controls be implemented to prevent a user from combining hazardous materials in a load unit device that constitute impermissible combinations. Upon detecting such an occurrence, the GUI preferably notifies the user via an error message box 186 as shown in FIG. 4(*b*). In the example shown in FIG. 4(*b*), a user has attempted to combine 12 pounds of a hazardous material in Class 1.3 for explosives with 1001 pounds of a hazardous material designated as "Inhalation Hazard 2.3 Zone B." Upon selection of the "think" button 176, the placard selection module operates to detect the error condition and display the message box 186 to notify the user that such a combination is impermissible.

While the present invention has been disclosed wherein the user has the ability to select placards for printing via either a placard menu GUI or a input parameter-based placard selector GUI, it should be readily understood that the present invention may be implemented with either or both of these options. Further, it should noted that the placard wizard GUI can be implemented to utilize parameters other than hazard class and weight. While class and weight are highly preferred because of their easy availability from the bill of lading, thereby reducing the potential for human error, as mentioned above, suitable alternative or additional parameters include UN number, North American number, hazardous material name, hazardous material description, and shipping label code.

Output Device 208:

The output device 208 can be any device that is capable of outputting a hard copy of a hazardous material placard. Preferably, the output device is a wide-frame printer such as an Epson Stylus Photo 2200 printer. The media upon which the placards are printed may include any media upon which a placard suitable for commercial use can be successfully printed. The preferred medium is matte paper, glossy paper, or paperboard that is inserted into a clear urethane plastic cover. Further, the medium preferably complies with the size, strength and durability criteria set forth in 49 CFR 172.519. Additional suitable media include printable vinyl media, photo paper, plain paper, plain paper with an adhesive backing, poster board, etc. Further, it should be noted that the output device may be implemented integrally with other components of the placard printing system (such in a kiosk implementation) or implemented as a separate component in the system (such as where a single output device is used with a LAN to print placards for several input devices). Such implementations will vary according to the needs of a practitioner of the present invention.

Processor 202:

The processor 202 operates to control the GUIs presented to the user, receive the input data from the input device 206, execute the placard selection program 210 retrieved from memory 204, and determine the appropriate placard for the shipment/storage of hazardous materials represented by the input data. As would be understood by those of ordinary skill in the art, the processor may be any processor capable of interacting with the input device, executing the placard selection program, and interacting with the output device. A preferred processor for the present invention is a processor having at least a 1.3 GHz speed. Also, as would be understood by those of ordinary skill in the art, while processor 202 is shown as a unitary box in FIG. 2, in implementation, the processor may be implemented in a distributed manner with several processing units, each performing different tasks.

Placard Selection Program 210:

The selection of an appropriate hazardous material placard for a given hazardous material to be shipped or stored is controlled by the placard selection program of the present invention. The placard selection program comprises a plurality of placard selection rules that define the conditions under which the various hazardous material placards are to be selected for the hazardous material that is to be shipped or stored. Preferably, the rules are implemented into executable programming code via known programming logic such as Visual Basic or other readily known programming languages.

The preferred placard selection rules for the present invention are those defined by Title 49, Parts 172–177 of the Code of Federal Regulations with respect to placarding requirements (the entire disclosures of which are incorporated herein by reference). In particular, the placard selection rules may be those defined by the conditions set forth in 49 CFR 172.504, 49 CFR 172.334, 49 CFR 172.505, and 49 CFR 172.101. Moreover, it is preferred that the placard selection rules implement segregation rules defined by 49 CFR 172.848 (for highway transportation) and other corresponding regulations for transportation via other means such as rail, air, and vessel. The segregation charts found in these regulations define the conditions under which different hazardous materials may or may not be loaded, transported, or stored together.

Further, placard selection charts that define suitable placard selection rules and that are relatively user-friendly are commercially available from companies such as J. J. Keller & Associates, Inc. of Neenah, Wis. (see, for example, J. J. Keller & Associates, Inc., "Hazardous Materials Chart", "Hazardous Materials Placarding Chart", and "Hazardous Materials Load and Segregation Chart", 1999 (the disclosures of all of which are incorporate herein by reference).

A programmer with routine skills may use the incorporated CFR regulations or incorporated publicly available placarding charts as flowcharts for developing program logic that implements these placard selection rules. Such programming logic preferably processes the user input parameter against "if/then/else" logic statements that implement the placard selection rules to identify one or more placards that are appropriate for a given amount of hazardous material(s) to be shipped or stored.

Figure 5:
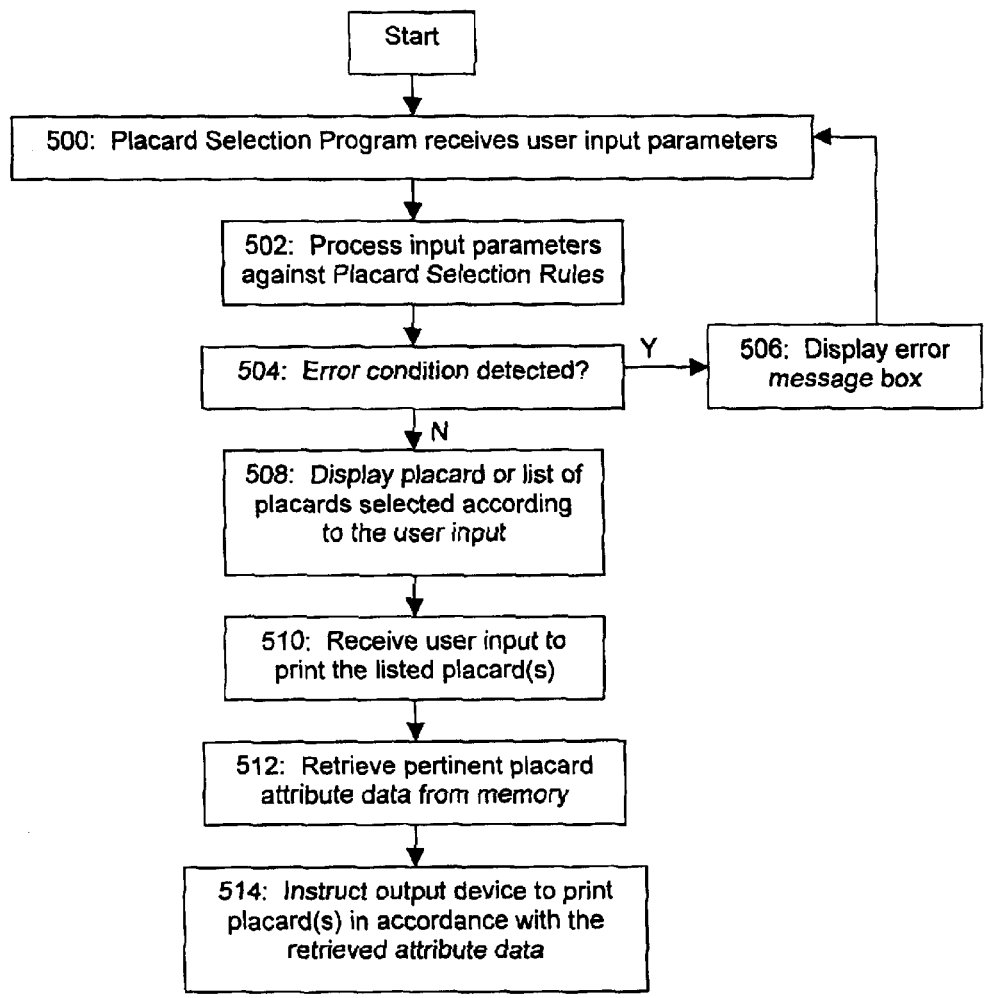
FIG. 5 is a flowchart depicting a preferred implementation of the placard selection program.

FIG. 5 illustrates the basic operation of the placard selection program. At step 500, the program receives input from the user corresponding to the above-described hazardous material parameters. At step 502, this input is processed against the placard selection rules to determine whether the hazard material(s) defined by the user input are allowed to be shipped or stored as such. If an error is detected, at step 506, the program can display an error message box such as box 186 in FIG. 4(b). As an example, for a user who is attempting to ship two types of hazardous materials that are incompatible with each other and may not be shipped on the same vehicle, steps 504 and 506 operate to notify the user of this error so that appropriate corrections or alternate shipping/storage arrangements can be made.

Figure 6:
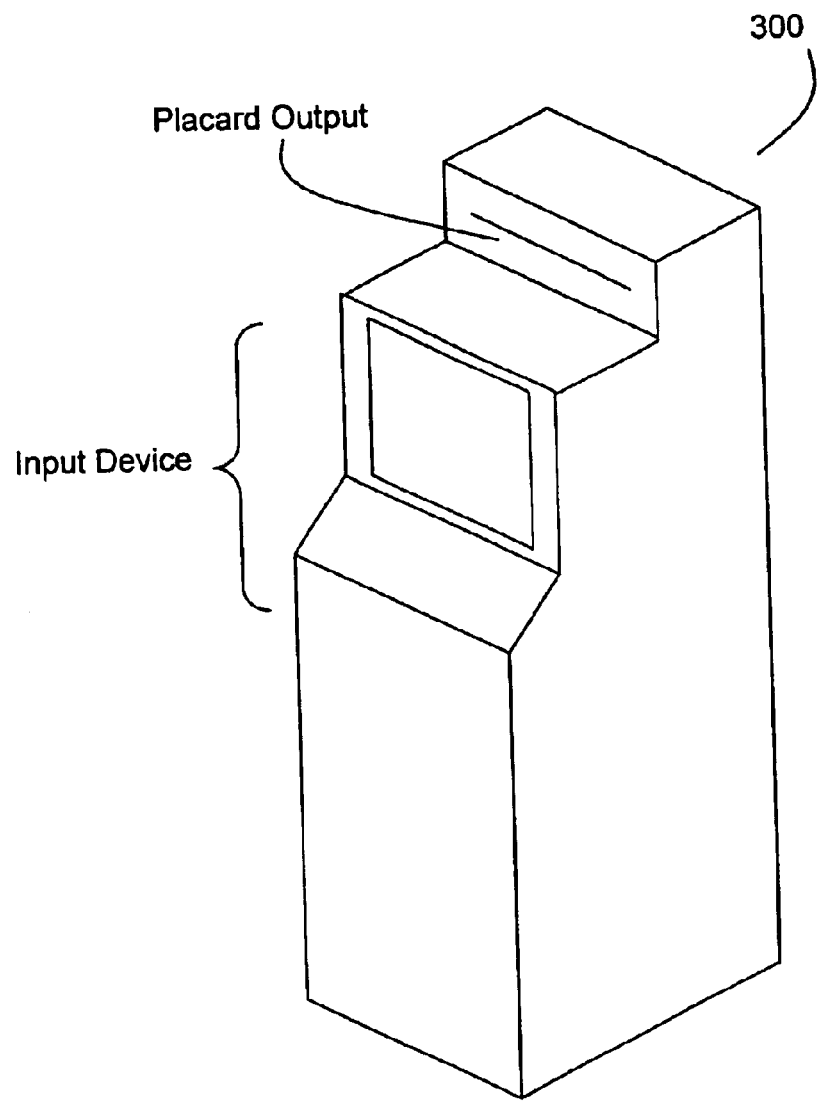
FIG. 6 illustrates an implementation of the present invention as a self-service kiosk.

If no error is detected at step 504, the program will identify one or more placards that are applicable to the user input and display each placard to the user, such as disclosed in fields 180 and 182 of FIG. 4(a). Once the user instructs the program to print the listed placard(s) (at step 510), the program retrieves the attribute data from memory that corresponds to the listed placard(s) at step 512. Thereafter, at step 514, the program instructs the output device to print the placard(s) in accordance with the retrieved attribute data.
Implementations:

FIG. 6 illustrates an embodiment of the present invention wherein the placard printing system is implemented as a self-service kiosk 300 wherein the user provides pertinent data to the system via the input device and an integral output device produces the placard as requested by the user.

Figure 7:
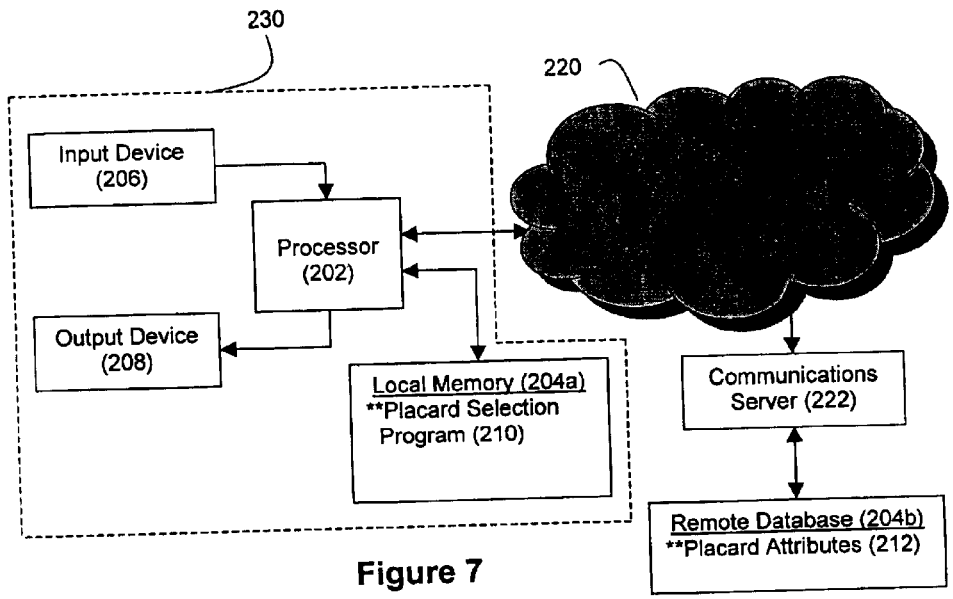
FIG. 7 illustrates an implementation of the present invention with distributed components.

FIG. 7 illustrates an embodiment of the present invention wherein the components of the placard printing system are implemented in a distributed manner. In FIG. 7, the memory 204 is distributed as local memory 204a for the processor 202 and a remote database 204b that is accessible by the processor 202 via a communications network 220. The communications network 220 may be any known network over which data can be communicated, including but not limited to a public wide area network (WAN) such as the Internet, a private WAN, a public or private local area network (LAN), a telecommunications network, or a wireless network. Further, as remote network communications are readily understood and known by those having ordinary skill in the art, and because no specific technique is preferred by the inventor herein, the details relating to the how remote network communications are implemented need not be set out herein.

In the embodiment of FIG. 7, the processor 202 preferably accesses the remote database 204b via server 222 to retrieve the placard attributes for hazardous material placard selected by the placard selection program 210 executed thereby. In this embodiment, the database 204b serves as a centralized database accessible by a plurality of placard printing devices 230 which are preferably located at transportation terminals or storage facilities to allow on-demand placard printing. The term placard printing device 230 is used to refer to the portions of the system 200 that are located at a transportation terminal, storage facility, or the like. The placard printing device 230 may include some or all of the components of system 200. By centralizing the database 204b, the present invention provides great flexibility when adjusting to changes in the appearance of hazardous material placards, That is, it the appearance of a given hazardous material placard is changed, the present invention can quickly accommodate that change by altering the content of database 204b rather than making what may be hundreds or thousands of changes to the memory units residing at all of the placard printing device locations.

Figure 8:
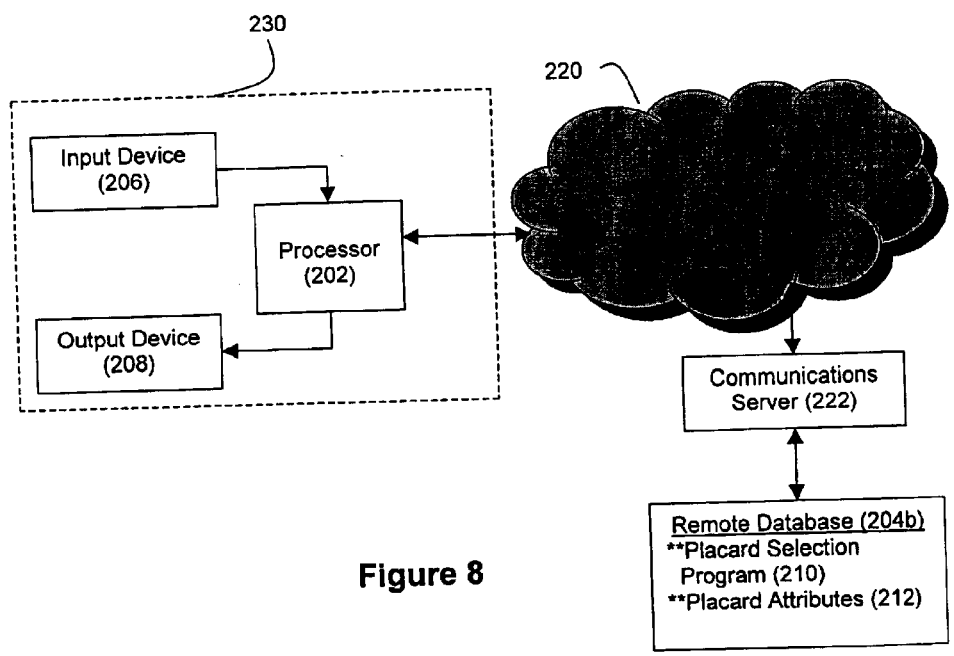
FIG. 8 illustrates an alternative implementation of the present invention with distributed components.

FIG. 8 illustrates an alternative embodiment wherein the remote database 204b stores both the placard attributes 212 and the placard selection program 210. With this embodiment, processor 202 will also access the remote database to retrieve the placard selection program. After the server 222 has communicated the placard selection program 210 to the processor 202 for execution thereby, the appropriate placard attributes can be retrieved from the remote database 204b. As with the embodiment of FIG. 7, by storing the placard selection program 210 at a centralized location, it becomes easier to modify the program 210 as changes are made to the rules governing the conditions under which hazardous materials placards are to be used.

Figure 9:
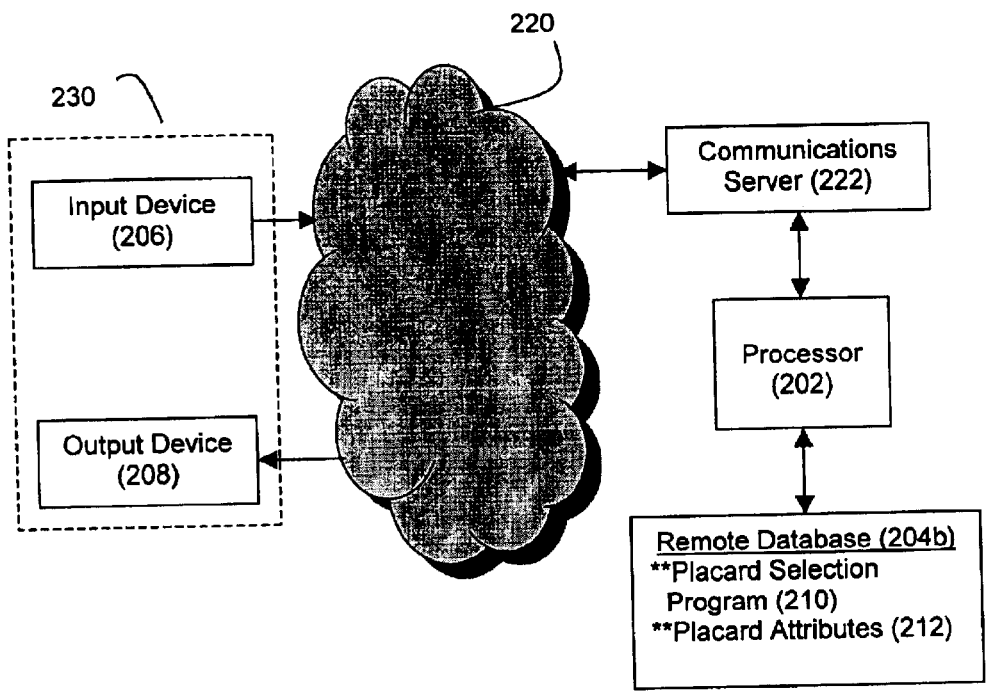
FIG. 9 illustrates another alternative implementation of the present invention with distributed components.
Figure 10:
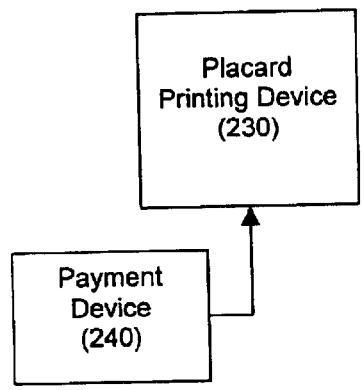
FIG. 10 illustrates a placard printing device that has been integrated with a payment device.

FIG. 9 illustrates yet another alternative embodiment wherein the processor 202 and database 204 are remote from the input device 206 and output device 208. In this embodiment, the input device 206 and output device 208 communicate with the processor 202 via the communications network 220. Input data received by the input device 206 is passed to the processor 202 over the network 220, The processor then executes the placard selection program 210 to identify the appropriate hazardous materials placard, and the processor thereafter retrieves the placard attributes corresponding to the selected placard from the database 204 for communication to the output device 208. Once in receipt of the placard attributes from the network 220, the output device can create the appropriate placard. With this embodiment, the placard printing devices 230 are essentially "dumb" terminals. While this implementation consolidates the primary processing tasks of the invention in a central location, it may introduce delays to the user because of the extra involvement of the communications network. However, as communication speeds continue to increase in the future, this delay may become less of a concern.
Effectuating Payment:

The present invention also preferably includes a means for effectuating payment for printing hazardous material placards. In one embodiment, as shown in FIG. 10, a, upfront payment device 240 such as those known in the art can be implemented with the placard printing system 200. For example, a coin slot device, bill-accepting device, or credit card/debit card reader of the types that are known in the art can be used, wherein printing of a placard is contingent upon a user providing sufficient payment therefor.

Figure 11A:
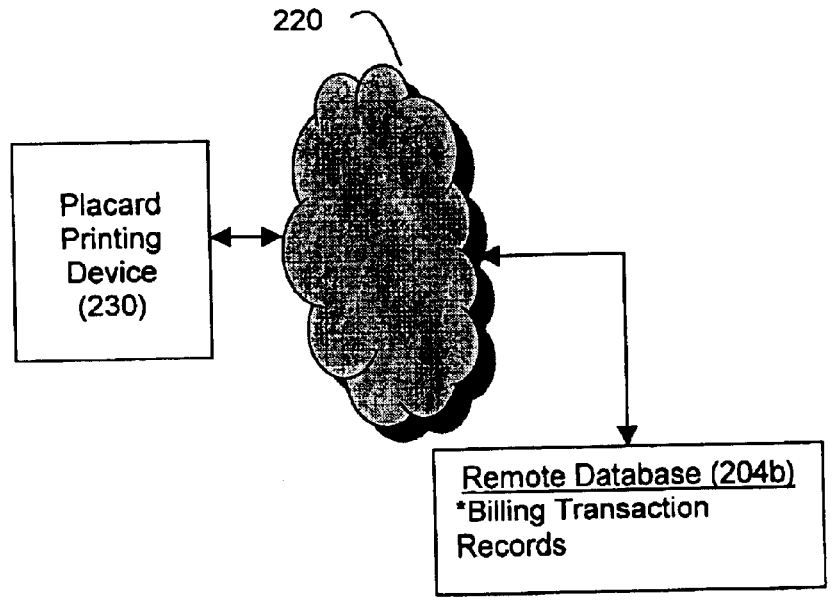
FIG. 11(a) illustrates a placard printing device that has been implemented with deferred billing.
Figure 11B:
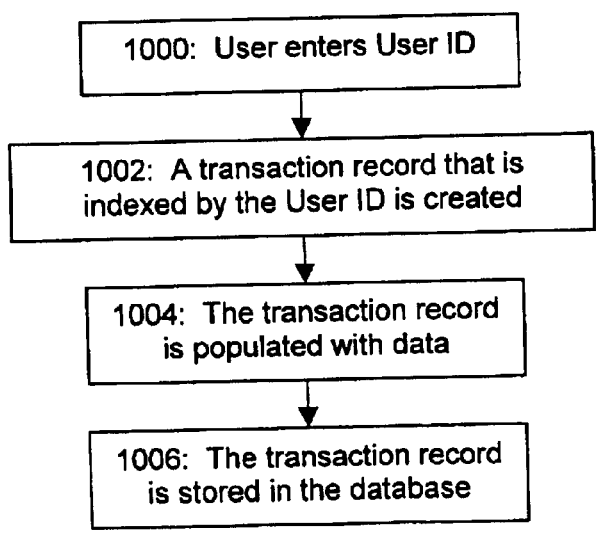
FIG. 11(b) is a flowchart depicting the creation of a transaction record for deferred billing.

FIG. 11(a) illustrates an implementation wherein deferred billing is used. With this embodiment, the remote database 204b is used for storing billing records. As shown in FIG. 11(b), as a user begins the placard printing process, he or she preferably provides a user ID to the system via input device 206 (step 1000). This user ID can be unique to the individual, unique to the company for which the user works, or unique to the company or person for whom the hazardous material is being transported or stored. Also, a user can be requested to provide both a unique individual user ID and a company ID to allow for more detailed transaction records. Thereafter, at step 1002, the processor creates a record for the transaction that is indexed by the user ID. As the transaction proceeds, this record can be populated with data such as the type of placard(s) printed, the cost for the placard(s), and the date and time of the printing (step 1004). At step 1006, the transaction record is stored in the database 204, and the appropriate entity (person or company) can be billed for the cost of the transaction.

It should be understood by those of ordinary skill in the art, that any of the embodiments of FIGS. 6–9 can be used in connection with the upfront payment or deferred billing implementations of the present invention.

Updating the Placard Selection Program or Stored Placard Attributes:

With the present invention, the central server 222 can be used to push changes in to the placard selection program or changes in placard attributes to the various placard printing devices 230. As shown in FIGS. 12(a) and (b), for any embodiments wherein the placard selection program 210 or placard attributes are stored locally by the placard printing device 230, changes to the placard selection program 210 and/or placard attributes can be sent from the central server 222 to the processors 202 over network 220 (step 1010). Thereafter, the processor can update the program 210 and/or attributes 212 stored in memory 204 as appropriate (step 1012). This updating procedure can be an effective technique for adjusting the operation of each placard printing device 230 to accommodate changes in hazardous material placard practices.

While the present invention has been described above in relation to its preferred embodiment, various modifications may be made thereto that still fall within the invention's scope, as would be recognized by those of ordinary skill in the art upon review of the teachings herein. For example, while the placard selection rules used by the present invention have been described in the context of compliance with the United States regulations, a person of ordinary skill in the art upon reading the specification would readily understand that the invention can also be implemented to comply with the regulations of other states, nations, provinces, or legal jurisdictions. As such, the full scope of the present invention is to be defined solely by the appended claims and their legal equivalents.

What is claimed is:

1. A system comprising:
   an input device through which a user can input parameters relating to a hazardous material to be transported or stored;
   a processor configured to execute a hazardous material placard selection program, the program being configured to determine a hazardous material placard for the hazardous material according to a relationship between the input parameters and a plurality of predetermined hazardous material placard selection rules; and
   an output device configured to print the determined placard.

2. The system of claim 1 wherein the input device and output device are located in a transportation terminal or storage facility.

3. The system of claim 1 wherein the printed placard complies with government regulations defining the determined placard's appearance.

4. The system of claim 1 wherein the input device is configured to receive input parameters from the user that relate to a hazardous material to be transported.

5. The system of claim 1 wherein the input device is configured to receive input parameters from the user that relate to a hazardous material to be stored.

6. The system of claim 1 further comprising:
   memory configured to store a plurality of hazardous material placard attributes corresponding to the appearance of a plurality of hazardous material placards;
   wherein the processor is further configured to retrieve the stored attributes corresponding to the determined hazardous material placard; and
   wherein the output device is a printer configured to print the determined placard in accordance with the retrieved attributes.

7. The system of claim 6 wherein the input device is configured to receive input parameters from the user that correspond to at least one of the group consisting of (1) a class of hazardous material, and (2) an amount of the hazardous material.

8. The system of claim 6 wherein the processor is in communication with the memory via a communications network.

9. The system of claim 6 wherein the input device and output device are remote from the processor and in communication with the processor via a communications network.

10. The system of claim 6 wherein the placard selection rules comply with government regulations relating to hazardous materials.

11. The system of claim 10 wherein the placard selection rules include segregation conditions.

12. The system of claim 6 wherein the stored attributes comprise the appearance of a graphical placard symbol.

13. The system of claim 12 wherein the stored attributes further comprise UN identification numbers.

14. The system of claim 13 wherein the stored attributes further comprise hazardous material classification numbers.

15. A system comprising:
   an input device through which a user can input parameters relating to a hazardous material to be transported or stored;
   a processor configured to determine a hazardous material placard for the hazardous material according to a computerized analysis of the input parameters;
   an output device configured to print the determined placard; and
   a payment device through which the user can effectuate payment for the printed placard, wherein the payment device is in communication with at least one of the group consisting of the input device, the processor, and the output device.

16. The system of claim 15 wherein the output device is configured to print the determined placard on the condition that the payment device has received sufficient payment from the user.

17. A placard printing system comprising:
   memory in which attribute data corresponding to a plurality of hazardous material placards is stored;
   a user interface configured to (1) graphically depict a menu of a plurality of hazardous material placards that are available for printing and (2) receive input from a user corresponding to a selection of a placard from the menu; and
   a processor in communication with the user interface and memory, the processor being configured to retrieve placard attribute data from memory that corresponds to the selected placard; and
   an output device in communication with the processor, the output device being configured to print a hazardous material placard in accordance with the retrieved attribute data.

18. The system of claim 17 further comprising a second user interface configured to receive user input parameters corresponding to a hazardous material to be transported or stored, wherein the processor is further configured to execute a placard selection program to select a placard for printing at least partially according to the input parameters.

19. The system of claim 18 wherein the placard selection program is configured to implement a plurality of placard selection rules that comply with government placarding regulations, and wherein the output device is configured to print the placard in a format that complies with government placarding regulations.

20. A system comprising:
an input device through which a user can input parameters relating to a hazardous material to be transported or stored;
a processor configured to determine a hazardous material placard for the hazardous material according to a computerized analysis of the input parameters; and
an output device configured to print the determined placard; and
wherein the input device is configured to receive input data from the user corresponding to an entity to be billed for the printed placard, and wherein the processor is further configured to communicate the billing data to a billing database for subsequent processing.

21. A method comprising:
providing an interface through which a user can input parameters relating to a hazardous material to be transported or stored;
determining a hazardous material placard for the hazardous material by executing a hazardous material placard selection program configured to determine a hazardous material placard according to a relationship between the input parameters and a plurality of hazardous material placard selection rules; and
printing the determined placard.

22. The method of claim 21 wherein the printing step comprises printing the determined placard such that the printed placard complies with applicable government regulations.

23. The method of claim 21 further comprising:
storing a plurality of hazardous material placard attributes corresponding to the appearance of a plurality of hazardous material placards; and
retrieving the stored attributes corresponding to the determined hazardous material placard; and
wherein the printing step comprises printing the determined placard in accordance with the retrieved attributes.

24. The method of claim 23 wherein the retrieving step includes retrieving the stored attributes from a remote database.

25. The method of claim 23 wherein the user input parameters correspond to at least one of the group consisting of (1) a class of hazardous material, and (2) an amount of the hazardous material.

26. The method of claim 23 wherein the placard selection rules comply with applicable regulations relating to hazardous materials.

27. The method of claim 26 wherein the applicable regulations are U.S. regulations.

28. The method of claim 27 wherein the placard selection rules include segregation conditions.

29. A method comprising:
providing an interface through which a user can input parameters relating to a hazardous material to be transported or stored;
determining a hazardous material placard for the hazardous material according to a computerized analysis of the input parameters;
printing the determined placard; and
storing billing data relating to the printed placard in a billing database.

30. The method of claim 29 wherein the billing data comprises a cost for the printed placard and an identification of a person or entity to be billed for the cost.

31. The method of claim 30 further comprising providing an interface through which a user can input data corresponding to the identification of the person or entity to be billed for the cost of the printed placard.

32. A method comprising:
providing an interface through which a user can input parameters relating to a hazardous material to be transported or stored;
determining a hazardous material placard for the hazardous material according to a computerized analysis of the input parameters;
printing the determined placard; and
providing a device through which the user can effectuate payment for the printed placard.

33. A method comprising:
storing a plurality of hazardous material placard selection rules;
storing a plurality of attributes corresponding to a plurality of hazardous material placards;
receiving input from a user corresponding to a hazardous material to be transported or stored;
selecting a hazardous material placard at least partially in response to the received input data and the placard selection rules;
retrieving at least one stored attribute that corresponds to the selected placard; and
creating a hazardous material placard in accordance with each retrieved attribute.

34. The method of claim 33 wherein the retrieving step comprises retrieving at least one stored attribute that corresponds to the selected placard from a remote database.

35. The method of claim 33 wherein the placard selection rules include segregation conditions.

36. The method of claim 33 wherein the placard selection rules comply with government regulations relating to hazardous materials.

37. The method of claim 36 wherein the created placard complies with government regulations relating to the selected placard.

38. The method of claim 37 wherein the placard creating step comprises printing a hazardous material placard in accordance with each retrieved attribute.

39. The method of claim 38 wherein the stored attributes comprise the appearance of a plurality of graphical placard symbols.

40. The method of claim 39 wherein the stored attributes further comprise hazardous material classification numbers.

41. The method of claim 40 wherein the stored attributes further comprise UN identification numbers.

42. The method of claim 38 wherein the input receiving step comprises receiving data from a user corresponding to a weight of a hazardous material and at least one selected from the group consisting of (1) a class of a hazardous material, (2) a UN number of a hazardous material, (3) a North American number of a hazardous material, and (4) a proper name of a hazardous material.

43. A hazardous material placard printing apparatus comprising:
an input device through which a user enters data corresponding to a shipment of a hazardous material;

a database within which a plurality of hazardous material placard attributes are stored, each hazardous material placard attribute identifying a graphical appearance for at least a portion of a hazardous material placard;

a processor in communication with the input device and the database, the processor being configured to (1) select a hazardous material placard from among a plurality of hazardous material placards at least partially according to the shipment data and a plurality of predetermined placard selection rules, and (2) retrieve placard attributes from the database that correspond to the selected hazardous material placard) and an output device in communication with the processor, the output device being configured to create a hazardous material placard according to the retrieved placard attributes.

44. The apparatus of claim 43 wherein the placard attributes comprises representations of the appearance of a plurality of graphical placard symbols.

45. The apparatus of claim 43 wherein the database is remote from the processor and in communication therewith via a communications network.

46. The apparatus of claim 43 wherein the input device and output device are remote from the processor and are in communication therewith via a communications network.

47. The apparatus of claim 43 wherein the predetermined placard selection rules and the created placard both comply with government regulations for hazardous material placards.

48. The apparatus of claim 43 wherein the database is also configured to store the predetermined placard selection rules.

49. The apparatus of claim 48 wherein the database comprises a first database and a second database, wherein the second database is remote from the processor and in communication therewith via a communications network, wherein the first database is configured to store the predetermined placard selection rules, and wherein the second database is configured to store the placard attributes.

50. The apparatus of claim 48 wherein the database comprises a first database and a second database, wherein the first database is remote from the processor and in communication therewith via a communications network, wherein the first database is configured to store the predetermined placard selection rules, and wherein the second database is configured to store the placard attributes.

51. A system comprising:

a placard printing device configured to print a hazardous material placard for a user in response to user input that corresponds to a shipment of a hazardous material, the device being further configured to select the hazardous material placard for printing according to a placard selection program executed thereon, the placard selection program being configured to process the user input to select the hazardous material placard suitable for the shipment; and a server remote from the device and in communication therewith via a communications network, the server being configured to communicate the placard selection program to the device for execution thereon.

52. The system of claim 51 wherein the device is configured to store the placard selection program communicated thereto for subsequent execution thereby.

53. The system of claim 52 wherein the server is further configured to communicate a placard selection program update to the device.

54. The system of claim 53 wherein placard selection program comprises a plurality of placard selection rules that comply with government regulations for hazardous material placards, and wherein the placard selection program update corresponds to changes to the placard selection rules that are necessary for the placard selection rules to comply with changes in government regulations for hazardous material placards.

55. A system comprising:

a placard printing device configured to print a hazardous material placard for a user from placard attribute data, the placard attribute data defining the graphical appearance of the placard to be printed; and a server remote from the device and in communication therewith via a communications network, the server being configured to communicate the placard attribute data to the device.

56. The system of claim 55 wherein the placard attribute data complies with applicable government regulations defining the appearance of hazardous material placards, and wherein the device is further configured to store the placard attribute data communicated thereto.

57. The system of claim 56 wherein the server is further configured to communicate a placard attribute data update to the device, wherein the update corresponds to a change in the stored placard attribute data that is necessary for compliance with a change in government regulations relating to the placard's appearance.

58. A computer readable medium comprising:

stored placard attribute data corresponding to the graphical appearances of a plurality of hazardous material placards;

executable code for selecting a hazardous material placard at least partially according to user input; and executable code for instructing an output device to print the selected placard in accordance with the placard attribute data corresponding to the selected placard.

59. The computer readable medium of claim 58 wherein the executable code for instructing the output device includes executable code for instructing the output device to print the selected placard such that the printed placard complies with government regulations.

60. The computer readable medium of claim 59 further comprising executable code for graphically displaying a menu of selectable hazardous material placards on a computer display.

61. The computer readable medium of claim 59 further comprising executable code for graphically displaying an interface through which a user can input parameters that correspond to a hazardous material to be transported or stored, and wherein the executable code for selecting a hazardous material placard is configured to select the placard at least partially in response to the input parameters received from the user.

62. A system comprising:

an input device through which a user selects a hazardous material placard from a menu of hazardous material placards;

memory in which placard attributes are stored, the placard attributes defining the graphical appearance of a plurality of hazardous material placards;

a processor in communication with the input device and memory, wherein the processor is configured to retrieve from memory the placard attributes corresponding to the selected placard; and an output device in communication with the processor, wherein the output device is configured to print one or more hazardous material placards in accordance with the retrieved placard attributes.

* * * * *